Oct. 13, 1953  J. L. WOOLLING  2,655,250
CONVEYER CHAIN
Filed March 17, 1949
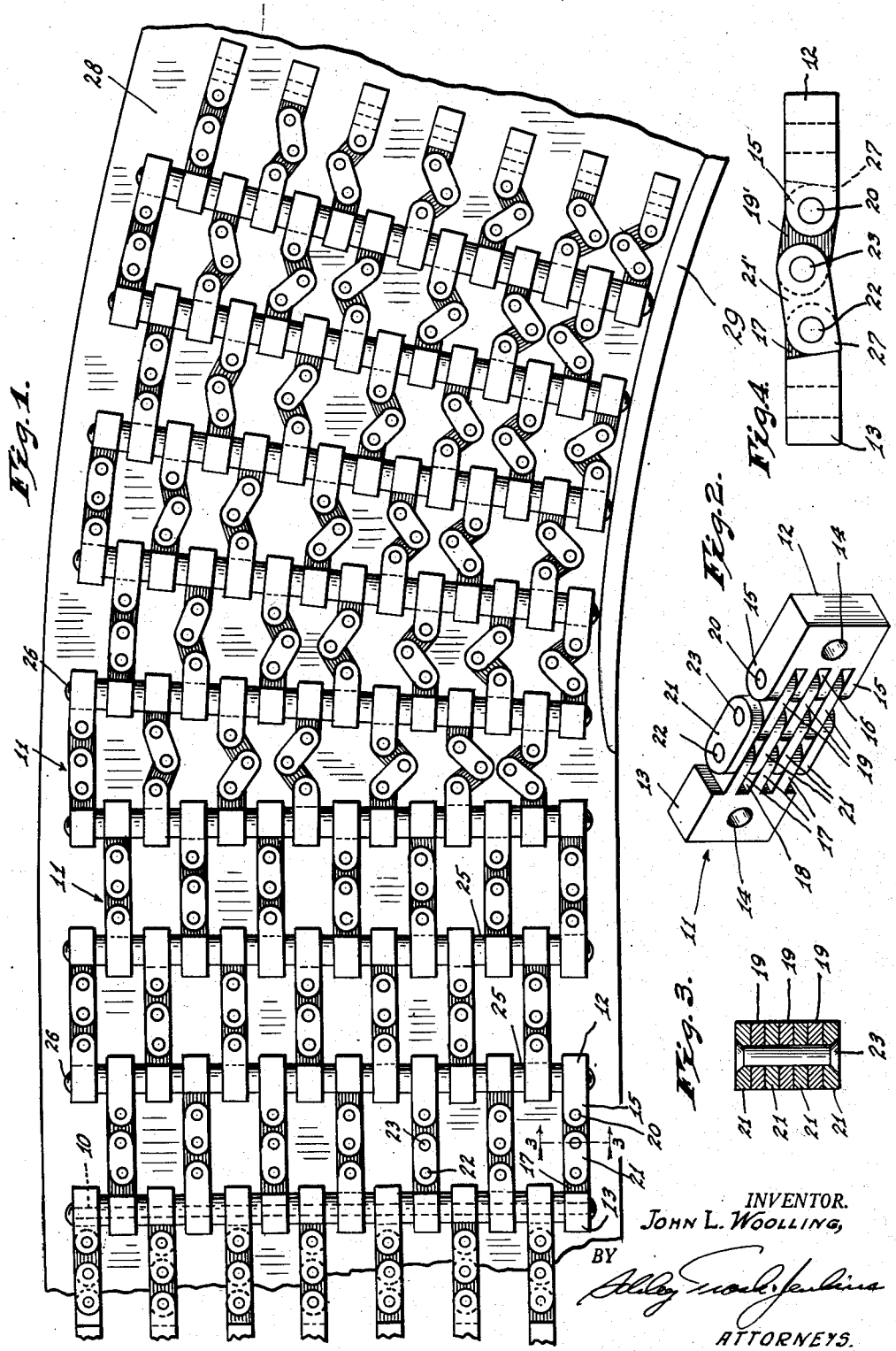
INVENTOR.
JOHN L. WOOLLING,
BY
ATTORNEYS.

Patented Oct. 13, 1953

2,655,250

UNITED STATES PATENT OFFICE 2,655,250

CONVEYER CHAIN

John L. Woolling, Indianapolis, Ind.

Application March 17, 1949, Serial No. 81,961

6 Claims. (Cl. 198—182)

This invention relates to a conveyor chain of the general type in which articles to be moved rest on and are supported by either the links of the chain or supports rigid with such links. As commonly made, the links of such a chain are individually rigid and are pivotally connected in an endless series by pivot pins which extend in parallel relation transversely of the chain. The articles to be conveyed may be supported directly on the links or on supporting elements respectively rigid with the links; but in any event, the article-supporting surfaces lie in a plane which is parallel to the pins by which the links are serially connected. Because each link is rigid, the chain pins always remain parallel to each other, and the chain is flexible in only one plane—i. e., the plane in which the chain flexes in passing around a driving sprocket the axis of which is parallel to the axes of the chain pins.

A conveyor chain of the type described has the disadvantage that it can convey articles only in a straight line normal to the chain pins. If it is desired that the articles follow a path which is not a straight line, it is necessary either to use some other type of conveyor or to use a plurality of chain conveyors disposed at angles to each other and constituting chords of the non-rectilinear path which the articles are to follow. The use of a plurality of conveyors not only introduces complications in driving mechanisms but also introduces problems in connection with the transferring of articles from one conveyor to the next.

It is the object of my invention to produce a chain conveyor which will be flexible in two planes, flexibility in one plane permitting it to run over the necessary sprockets and flexibility in the other plane permitting the conveyor to follow a curved path from one sprocket to another. Another object of the invention is to produce a chain conveyor which will be flexibile in two planes and which will still have the article-supporting surfaces of chain links disposed in coplanar relationship over that stretch of the conveyor which is being utilized for the purpose of conveying articles.

In carrying out my invention, I employ a plurality of chain pins which are connected in an endless series by links extending between adjacent pins. Each of the links which interconnects two adjacent chain pins is itself articulated, comprising a pair of blocks pivotally associated respectively with adjacent chain pins and operatively interconnected by means which will permit the two blocks to approach each other but which will limit their separation. One such means comprises link-plates pivotally connected respectively to the two blocks and to each other on axes normal to the common plane of the adjacent chain pins. Desirably, corresponding surfaces of the two blocks constitute article-supporting surfaces, and the outer surface of each outer link-plate is arranged to be coplanar with the article-surfaces of the blocks so that it may aid in supporting the articles to be conveyed.

The accompanying drawing illustrates my invention: Fig. 1 is a fragmental plan view of a stretch of chain flexed in the plane of its chain pins; Fig. 2 is an isometric view of a single chain link; Fig. 3 is a transverse section on the line 3—3 of Fig. 1; and Fig. 4 is a plan view of a single link of modified construction.

A chain embodying my invention comprises a multiplicity of chain pins 10 interconnected in an endless series by links each designated in its entirety by the reference numeral 11. The particular link shown in Fig. 2 comprises two blocks 12 and 13, provided with transverse holes 14 for the respective reception of two adjacent chain pins 10. The block 12 is provided with a series of parallel fingers 15 separated by intervening spaces 16. The block 13 is provided with a series of spaced fingers 17 equal in number to the spaces 16 of the block 12 and respectively coplanar with such spaces. A set of link plates 19, each received in one of the spaces 16, are pivotally connected to the block 12 as by means of a rivet or pin 20. A second set of link plates 21 distributed in the slots 18 and against the outer faces of the outer fingers 17 on the block 13, are pivotally connected to the block 13 as by a rivet or pin 22 and to the link plates 19 as by a rivet or pin 23. The axes of the several pivot pins 20, 22, and 23 are parallel to each other, and perpendicular to the common plane of the axes of the pin-receiving holes 14 in the blocks 12 and 13.

For simplicity and ease of construction, the fingers 15 on the block 12, the fingers 17 on the block 13, and each of the link plates 19 and 21 are desirably of substantially the same thickness. The outer surfaces of the outer link plates 21 are desirably coplanar with the corresponding surfaces of the two blocks 12 and 13. The rivets 20, 22, and 23 have countersunk heads, as indicated in Fig. 3, so that they will not interfere with articles being conveyed by the chain.

In the assembled chain, each pair of adjacent chain pins 10 is interconnected by a plurality of articulated links 11, such links being arranged in spaced relation on the pins to receive between them other links 11 extending to other pins 10. The links on each pin are separated by cylindrical collars 25 which, in addition to maintaining the links in properly transversely spaced relation, also serve as sprocket-engaging elements through which the chain is driven. Conveniently, two adjacent, longitudinally coextensive links are reversed in position, the block 13 of one link being on the same pin 10 as the block 12 of the other. By selecting pins 10 of appropriate length, the chain may be made of almost any width. The outer links are held on the pins 10 as by providing such pins with heads 26.

The chain illustrated and described may function as an ordinary conveyor chain articulating in the usual manner about the axes of the pivot pins 10 as it passes over driving and idler sprockets. However, if desired, the chain can operate in a path curved in the plane of the chain, as indicated at the right of Fig. 1, the link plates 19 and 21 assuming oblique positions to permit the chain pins 10 to move out of parallelism to the extent necessary to permit the chain to flex in its own plane. To support the weight of the chain and the weight of the load it carries between sprockets, the conveying stretch of the chain may run on a plate 28, such plate being provided with guide shoes 29 at points where the chain is to flex in its own plane.

In the particular chain illustrated in the drawing, each block 12 has four fingers 15 and each block 13 has four fingers 17. The number of fingers on each block may vary, and it is not necessary that the number of fingers on one block be different from that on the other block. It is desirable, however, that in each link the outer surfaces of outer link-plates be coplanar with surfaces of the blocks; as that arrangement provides a more satisfactory support for the articles being conveyed and also increases the bearing area between the chain and the supporting plate 28.

While the link-plate connection between the two blocks 12 and 13 is preferred, my invention can be practiced with other types of connecting means. It is necessary only that the connecting means permit the two blocks 12 and 13 to move toward each other while positively limiting the distance by which they may be separated.

It will be obvious from Fig. 1 that interference between the link-plates of adjacent links can limit the maximum curvature of the chain in its own plane. Such maximum curvature can be increased by so constructing the chain that displacement of all link-plates in the links associated with adjacent pins always occurs in the same direction. One means for accomplishing this result is shown in Fig. 4, where the link-plates 21' and 19' are formed with shoulders 27 which, by engagement with a block 13 or 12 at the bases of the fingers thereon, limit swinging of the link-plates to positions in which the intermediate pivot pin 23 will always lie on one side of the common plane of the other pivot pins 20 and 22. As a result, when the chain bends in its own plane and the blocks 12 and 13 of links adjacent the inside of the bend move toward each other, each pivot pin can move laterally of the chain in only one direction; and if all the links interconnecting adjacent pins 10 are similarly arranged, the link-plates of those links will be displaced in the same direction.

I claim as my invention:

1. In a conveyor chain, a series of spaced, transverse pins, links connecting adjacent ones of said pins, each of said links comprising a pair of blocks having holes respectively receiving adjacent pins and two pivotally interconnected sets of link-plates pivotally attached respectively to said two blocks, the axes of the pivotal connections of the link plates to each other and to the blocks being perpendicular to the common plane of the pin-receiving holes.

2. The invention set forth in claim 1 with the addition of sprocket-engaging rollers mounted on each pin between adjacent blocks.

3. The invention set forth in claim 1 with the addition that each of said blocks is provided with spaced fingers between which link-plates are received, the outer surfaces of the blocks and of the outermost link-plates being coplanar on each face of the chain.

4. In a conveyor chain, a series of spaced, transverse pins, links connecting adjacent ones of said pins, each of said links comprising a pair of blocks having holes respectively receiving adjacent pins and a plurality of pivotally interconnected link-plates the end ones of which are pivotally connected respectively to said blocks, the axes of the pivotal connections of the link plates to each other and to the blocks being perpendicular to the common plane of the pin-receiving holes.

5. In a conveyor chain, a series of spaced, transverse pins, links connecting adjacent ones of said pins, each of said links comprising a pair of blocks having holes respectively receiving adjacent pins, said holes fitting the pins they respectively receive to limit movement of each block and its associated pin to rotative movement about the pin-axis, and means operatively interconnecting said blocks to limit their separation while permitting them to approach each other.

6. In a conveyor chain, a series of spaced, transverse pins, a plurality of transversely spaced links interconnecting adjacent ones of said pins, each of said links limiting separation of such pins while permitting them to approach each other, and comprising a plurality of movable members and means for serially interconnecting said members and for confining their relative movement to the common plane of the pins which the link interconnects.

JOHN L. WOOLLING.

References Cited in the file of this patent

UNITED STATES PATENTS

| Number | Name | Date |
|---|---|---|
| 1,773,426 | Haiss | Aug. 19, 1930 |
| 1,805,430 | Rowe | May 12, 1931 |
| 1,845,935 | Pink | Feb. 16, 1932 |
| 2,010,124 | Worrall | Aug. 6, 1935 |